United States Patent [19]

Iaboni et al.

[11] 4,175,603
[45] Nov. 27, 1979

[54] GRASS BAG CLAMP AND SPREADER

[76] Inventors: Albert Iaboni; Biagio Iaboni, both of 89-27 198th St., New York, N.Y. 11423

[21] Appl. No.: 802,120

[22] Filed: May 31, 1977

[51] Int. Cl.² .......................................... B65D 33/16
[52] U.S. Cl. ........................................ 150/4; 56/202
[58] Field of Search ................... 56/202; 150/2-6, 150/16, 17, 18, 23, 25; 24/221 K

[56] References Cited
U.S. PATENT DOCUMENTS

| 1,093,681 | 4/1914 | Beste | 150/42 |
|---|---|---|---|
| 1,155,375 | 10/1915 | Shannon | 150/5 |
| 1,753,458 | 4/1930 | Willis | 150/5 |
| 2,015,473 | 9/1935 | Hankel | 150/6 |
| 2,177,215 | 10/1939 | Hodgkinson | 24/221 K |
| 2,717,014 | 9/1955 | Corn | 150/4 |
| 3,189,965 | 6/1965 | Parsons | 24/221 K |
| 3,421,302 | 1/1969 | Dahl | 56/202 |
| 3,724,186 | 4/1973 | Mattson | 56/202 |

Primary Examiner—Allan N. Shoap
Attorney, Agent, or Firm—Blum, Moscovitz, Friedman & Kaplan

[57] ABSTRACT

A waste bag for use with lawn mowers and other gardening machinery having a sleeve formed with first and second openings on opposed sides thereof, a first fixed frame in the first opening and a second selectively closable and openable frame in the second opening. The second frame is defined by four elongated rigid members hingedly joined at their respective ends and a locking arrangement for selectively holding the frames in a closed position.

2 Claims, 7 Drawing Figures

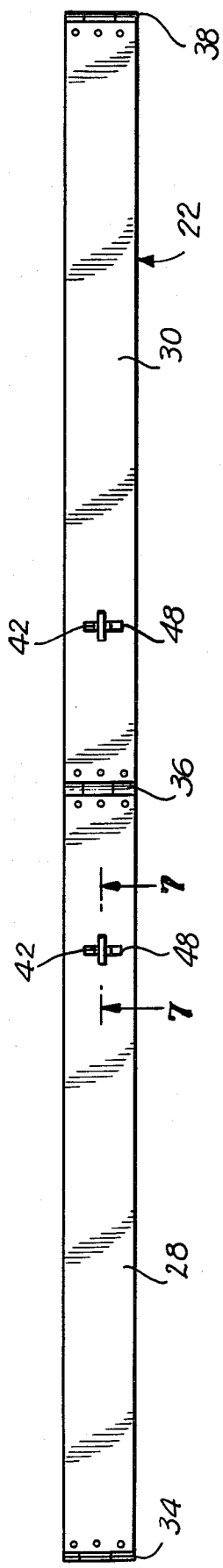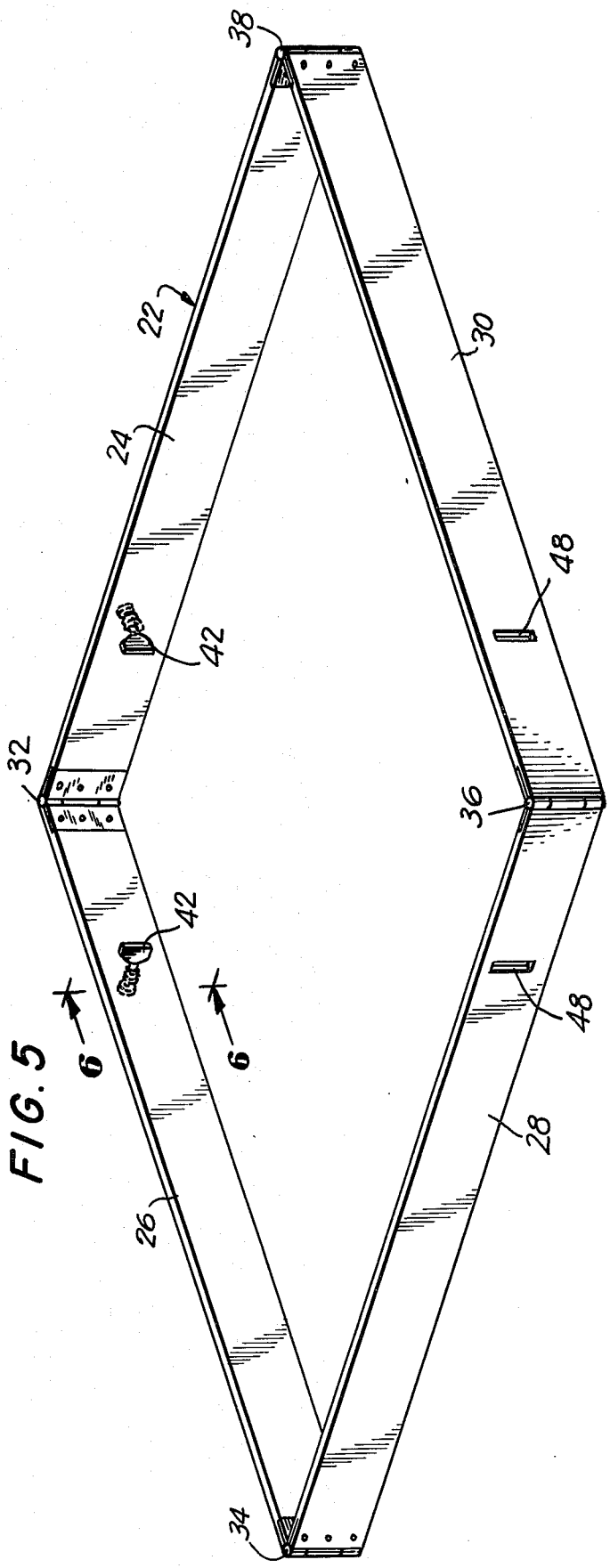

GRASS BAG CLAMP AND SPREADER

BACKGROUND OF THE INVENTION

This invention relates generally to waste bags for lawn mowers or other garden equipment. In the art, such waste bags have generally been provided with a zipper-type of closure at its outer end for the emptying of the waste bag. Such zipper-type of closures tend to snag and suffer other defects with use and age. Further, emptying a bag having a zipper-type of closure is relatively time-comsuming since a maximum opening-size is difficult to maintain.

SUMMARY OF THE INVENTION

Generally speaking, in accordance with the invention, a waste bag is provided having a sleeve formed with first and second openings on opposed ends thereof, a first fixed frame in said first opening and a second selectively openable and closable frame in said second opening, said second frame including four elongated members, hinge means joining said four members at their respective ends to define a parallelogram-shaped opening selectively closable so that each member defining each pair of adjacent members are in facing relation when said second frame is in a closed position, and further including means for securing said second frame in its closed position. Said securing means may include twist-nut means extending through an opening in one member of each of said pairs of members to maintain the imposition by a pair of laterally extending heads on opposed ends thereof, and corresponding openings in the other member of each pair for receipt of one of said heads when said second frame is in its closed position. Spring means may be provided intermediate the outer head and the member of each twist-nut means.

Accordingly, it is an object of the invention to provide a waste bag which is readily openable and closable, and which, when opened, is retainable in a maximum opening configuration for ease of emptying.

BRIEF DESCRIPTION OF THE DRAWINGS

For a fuller understanding of the invention, reference is had to the following description taken in connection with the accompanying drawings, in which:

FIG. 4 is a side elevational view of the second frame of the waste bag of FIG. 1 in its closed position;

FIG. 5 is a perspective view of the second frame of the waste bag of FIG. 1 in its open position;

DESCRIPTION OF THE PREFERRED EMBODIMENTS

Figure 1:
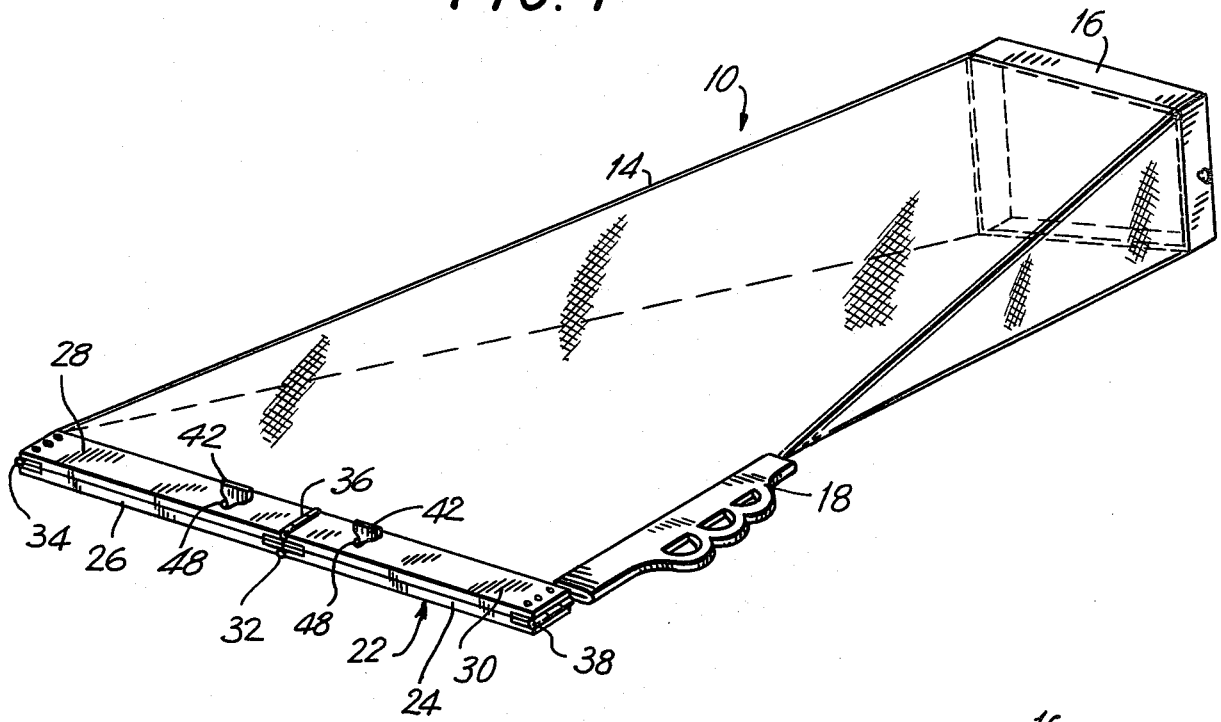
FIG. 1 is a perspective view of a waste bag in accordance with the invention in the closed position.
Figure 2:
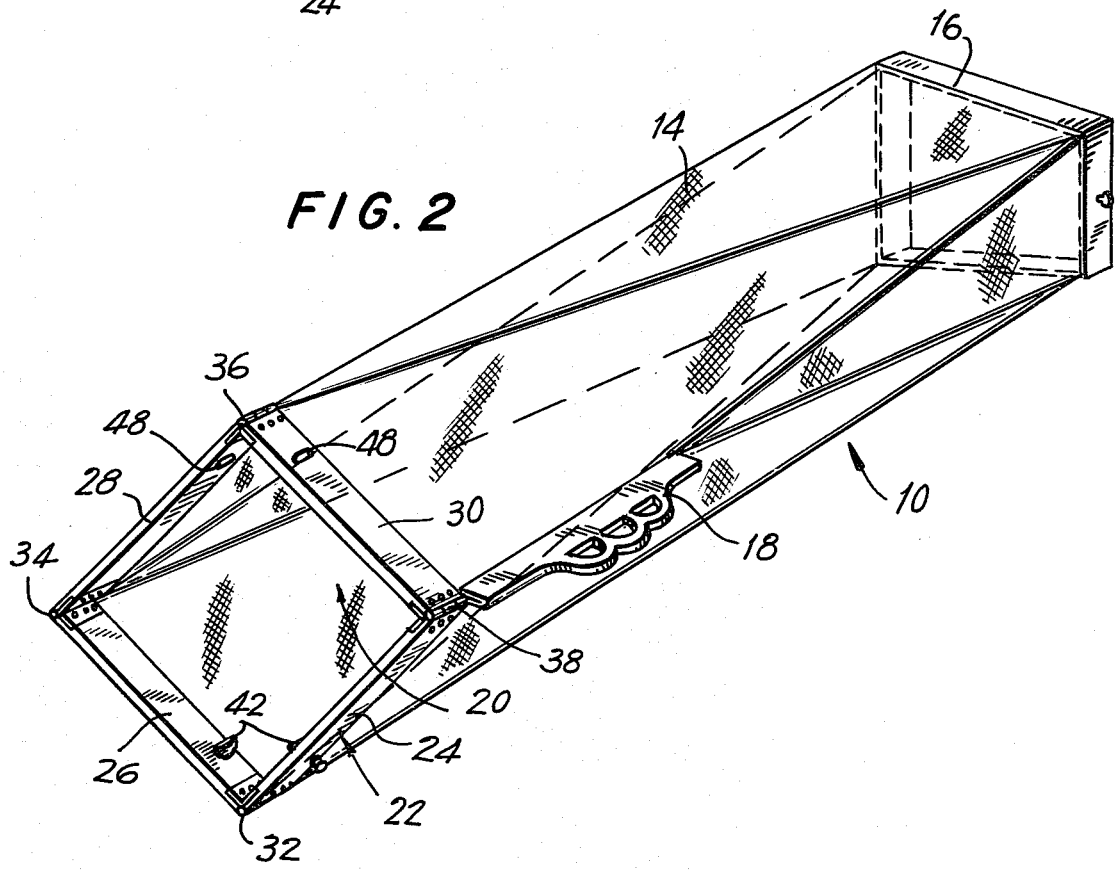
FIG. 2 is a perspective view of the waste bag of FIG. 1 in its first position.
Figure 3:
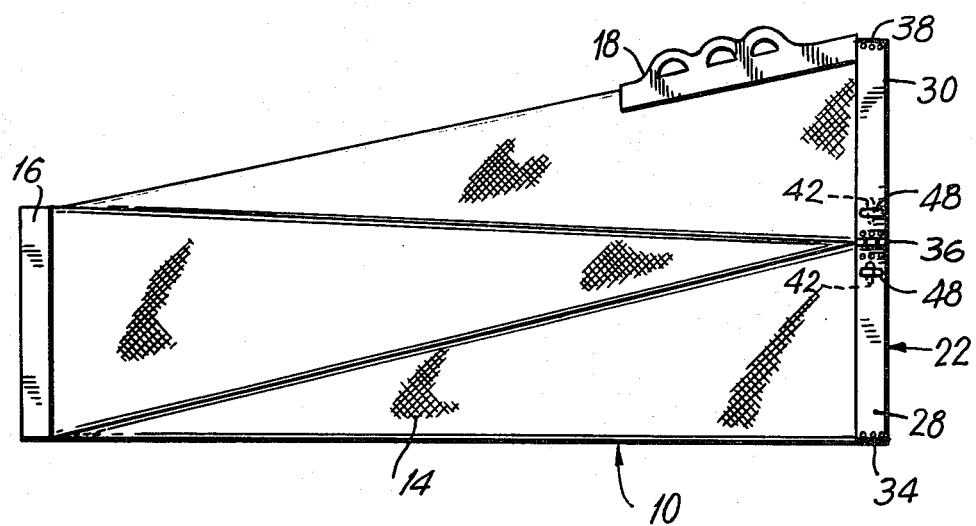
FIG. 3 is a side elevational view of the waste bag of FIG. 2.
Figure 6:
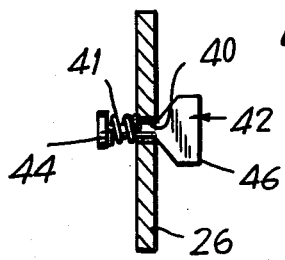
FIG. 6 is a sectional view taken along lines 6—6 of FIG. 5.
Figure 7:
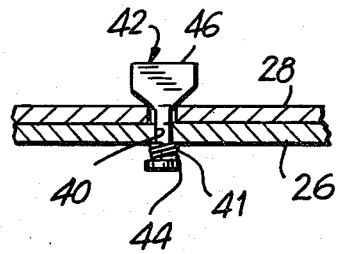
FIG. 7 is a fragmentary sectional view taken along lines 7—7 of FIG. 4.

Referring to the drawings, the waste bag 10 depicted is provided with a sleeve 14 having a first opening in which is mounted a fixed frame 16 for retaining said first opening and for connection to the output of a lawn mower or other gardening equipment. A handle member 18 is fixed to one edge of sleeve 14. Fixed in a second opening 20 at the opposed end of sleeve 14 to first frame 16 is a second frame 22 consisting of four elongated members 24, 26, 28 and 30 coupled at their respective ends by hinges 32, 34, 36 and 38. As shown in FIG. 2, when the bag is in its open position, the four members of second frame 22 define a parallelogram. As shown in FIG. 1, when the second frame is in its closed position, the four members defining said second frame are aligned with the members of each adjacent pair in facing relation. Thus, members 26 and 28 defining a pair are in facing relation, as are members 24 and 30. In order to maintain the second frame in its closed position during use of the lawn-mower or other garden equipment, each of members 24 and 26 are formed with an aperture 40 (FIGS. 6 and 7) to which the elongated body of a twist-nut 42 extends. Twist-nut 42 is provided with a first head 44 on the outer side thereof which serves to support a spring 46 extending around the body of spring nut 42 intermediate head 44 and member 26 of second frame 22. The inner end 46 of twist-nut 42 is flattened for manipulation and for passage through a substantially correspondingly shaped opening 48 in each of members 26 and 30. When second frame 22 is closed (from the position shown in FIG. 5 to the position shown in FIG. 4), the flattened head 46 of each twist-nut 42 extends through the corresponding opening 48. The user may then grasp each twist-nut by the flattened portion 46 extending through each opening 48, pull same against the bias of spring 46 and rotate same about 90° to releasably lock the second frame in its closed position.

In one embodiment, the four members 24, 26, 28 and 30 are aluminum bars having a ⅛ inch thickness by 1 inch width and a length of 11 and ½ inches each. When opened, a square opening 11 and ½ inches across is provided. When closed, the first frame extends for 23 inches. The first frame 16 may be formed of a trapezoid shape having a first base 7 and ¾ inches, a second base of 5 and ¼ inches and a pair of sides of 8 inches in length. The sleeve 14 may be 36 inches in length and the handle 18 may be 12 inches in length. The twist-nuts may be 1 and ¼ inches in length with a flattened twist head of 5/16 inch.

We claim:

1. In a waste bag for mounting on lawn mowers and the like and including an elongated sleeve formed with first and second openings on opposed ends thereof and a first fixed frame mounted in said first opening for defining an entrance to said waste bag, the improvement comprising a second selectively openable and closable frame mounted in said second opening for selectively opening and closing said second opening to define an exit from said sleve, said second frame comprising first, second, third and fourth elongated members, hinge means joining said first member to said second and fourth members and said third member to said second and fourth members at their respective ends to define a parallelogram-shaped opening selectively closable so that said first and second members and said third and fourth members are in facing relation when said second frame is in a closed position; and means for releasably securing said second frame in its closed position, said securing means including a first twist-nut means extending through an aperture in said first member and formed with a pair of laterally extending heads in spaced relation on opposed sides of said first member, said securing means further including a second twist-nut means extending through an aperture in said fourth member and formed with a pair of laterally extending heads in spaced relation on opposed sides of said fourth member, the head of said first twist-nut means facing said second member when said second frame is in its closed position, said head of said first twist-nut means having one lateral dimension greater than another lateral dimension, the head of said second twist-nut means facing said third member when said second frame is in the closed position, said head of said second twist-nut means having one lateral dimension greater than another lateral dimension, said second member being formed with an opening positioned and dimensioned to receive said facing head of said first twist-nut means when said second frame is in its closed position, said third member being formed with an opening positioned and dimensioned to receive said facing head of said second twist-nut means when said second frame is in its closed position, each said opening being shaped so that the head of the associated twist-nut means passes through the opening at one rotational orientation of the associated twist-nut means and is prevented from passing through the opening at another rotational orientation of the associated twist-nut means to effect positive locking for retaining said second frame in its closed position.

2. The waste bag as recited in claim 1, including first spring means extending about said first twist-nut means intermediate said first member and the head of said first twist-nut means on the side of said first member not facing said second member when said second frame in in its closed position to bias said first twist-nut means in a direction away from said second member, and second spring means extending about said second twist-nut means intermediate said fourth member and the head of said second twist-nut means on the side of said fourth member not facing said third member when said second frame is in its closed position to bias said second twist-nut means in a direction away from said third member.

* * * * *